(12) United States Patent
Yang et al.

(10) Patent No.: US 6,308,575 B1
(45) Date of Patent: Oct. 30, 2001

(54) MANUFACTURING METHOD FOR THE MINIATURIZATION OF SILICON BULK-MACHINED PRESSURE SENSORS

(75) Inventors: Lung-Jieh Yang, Taipei; Yih-Min Chang, 11th Fl.-3, No. 34, Ming-Chan 1$^{st}$ Road, Kaohsiung, both of (TW)

(73) Assignee: Yih-Min Chang, Kaohsiung (TW)

( * ) Notice: Subject to any disclaimer, the term of this patent is extended or adjusted under 35 U.S.C. 154(b) by 0 days.

(21) Appl. No.: 09/311,293

(22) Filed: May 14, 1999

(51) Int. Cl.$^7$ .................................................. G01L 9/06
(52) U.S. Cl. ........................................................ 73/727
(58) Field of Search ............................... 73/720, 721, 726, 73/727, 754; 29/621, 621.1; 338/2, 4, 42, 325, 327; 156/631.1, 633.1, 647.1, 657.1, 662.1; 216/2, 33

(56) References Cited

U.S. PATENT DOCUMENTS

| 5,614,678 | * | 3/1997 | Kurtz et al. | 73/727 |
| 5,702,619 | * | 12/1997 | Kurtz et al. | 216/2 |
| 6,150,917 | * | 11/2000 | Meyer et al. | 338/4 |

* cited by examiner

*Primary Examiner*—William Oen
(74) *Attorney, Agent, or Firm*—Bacon & Thomas

(57) ABSTRACT

A method for manufacturing micro pressure sensors and the structure of the micro pressure sensor are disclosed. A bulk silicon wafer is provided to have an upper face formed thereon a desired circuit arrangement including a plurality of contact pads. The bulk silicon wafer defines a cutoff in an upper side portion thereof. A glass substrate is then provided to have an upper face defined therein a shallow cavity. The glass substrate has a plurality of contact pads formed on the upper face thereof. The bulk silicon wafer is bonded to the glass substrate in such a manner that the upper face of the bulk silicon wafer is attached to the upper face of the glass substrate and the plurality of contact pads on the bulk silicon wafer securely attach to the plurality of contact pads on the glass substrate. An etching process is undertaken to reduce the bulk silicon wafer down to a thin membrane. Finally the bulk silicon wafer is etched to expose the contact pads on said glass substrate. The size of the micro pressure sensor produced by the method can be miniaturized because the cavity is so shallow such that the side faces of the cavity are not significantly inclined with respect to the upper face of the glass substrate even though undercut in the side faces may be encountered due to the side etching effect whereby no chip area is wasted and the miniaturization of the silicon bulk-machined sensors is possible.

17 Claims, 4 Drawing Sheets

MANUFACTURING METHOD FOR THE MINIATURIZATION OF SILICON BULK-MACHINED PRESSURE SENSORS

BACKGROUND OF THE INVENTION

1. Field of the Invention

The present invention relates to the field of micro pressure sensor, and more particularly, to a manufacturing method for the miniaturization of silicon bulk-machined micro pressure sensors, and the structure of the micro pressure sensor manufactured by such a manufacturing method.

2. Description of Related Art

FIG. 5 shows the structure of a conventional micro-sensor fabricated by silicon bulk-micromachining. Such a micro-sensor is produced by bonding a bulk silicon wafer 51 to a glass substrate 52. A cavity 53 is defined in a first face 511 of the bulk silicon wafer 51 before bonding such that a predetermined portion of the bulk silicon wafer 51 is provided as a diaphragm 54 Multiple resistors 55 and circuit connection (not shown) are formed on a second face 512, which is opposite to the first face 511, of the bulk silicon wafer 51. Normally, there are four resistors 55 located on the edge of the diaphragm 54 so that the pressure asserted on the diaphragm 54 can be measured via the resistors 55. This conventional micro-sensor suffers a disadvantage in that the dimension thereof is difficult to miniaturized. Because of the lattice structure of the bulk silicon wafer 51, it is hardly to define a cavity 53 by known etching technique with side faces 531 perpendicular to the diaphragm 54. Instead, the side faces 531 of the cavity 53 are always inclined with respect to the diaphragm 54, which are known as the (111)-face slopes in the art. Such face slopes will result in wasting of chip area and therefore, prohibit the miniaturization of the silicon bulk-machined sensors.

FIG. 6 shows the structure of another conventional micro-sensor fabricated by silicon bulk-micromachining. This micro-sensor is produced by bonding a first bulk silicon wafer 61 to a second bulk silicon wafer 62. The first bulk silicon wafer 61 is flat and provided as a diaphragm. The second bulk silicon wafer 62 has a cavity 63 defined in an upper face thereof. Multiple resistors 65 and circuit connection (not shown) are formed on the first bulk silicon wafer 61 for sensing the pressure asserted thereon. Because the resistors 65 has to be located on the edge of the cavity 63, an alignment process must be undertaken when forming the resistors 65. Further, since a high temperature annealing process has to be executed after bonding the first bulk silicon wafer 61 to the second bulk silicon wafer 62 to securely combine them together, the resistors 65 can be formed only after the bonding process to avoid being damaged by the high temperature. As a result, because the cavity 63 is inside the combination of the first and second bulk silicon wafers 61, 62 and both of the bulk silicon wafers 61, 62 are non-transparent, it is difficult to form the resistors 65 at desired positions with an alignment process. Therefore, there is a desired to improve the structure and the manufacturing method of the above micro pressure sensors to mitigate and/or obviate the aforementioned problems.

SUMMARY OF THE INVENTION

The objective of the present invention is to provide a manufacturing method which is able to miniaturize the size of a silicon bulk-machined micro pressure sensor, and the structure of the micro pressure sensor manufactured by such a manufacturing method.

In accordance with one aspect of the present invention, the manufacturing method in accordance with the present invention includes a step to provide a bulk silicon wafer having an upper face formed thereon a desired circuit arrangement including a plurality of contact pads. The bulk silicon wafer defines a cutoff in an upper side portion thereof. A glass substrate is then provided to have an upper face defined therein a cavity having a relative small depth so that the side faces of the cavity are not significantly inclined with respect to the upper face of the glass substrate even though under cut in the side faces may be encountered due to an side etching effect. The glass substrate has a plurality of contact pads formed on the upper face thereof. The bulk silicon wafer is bonded to the glass substrate in such a manner that the upper face of the bulk silicon wafer is attached to the upper face of the glass substrate and the plurality of contact pads on the bulk silicon wafer securely attach to the plurality of contact pads on the glass substrate. An etching process is undertaken to reduce the bulk silicon wafer down to a thin membrane. Finally the bulk silicon wafer is etched to expose the contact pads on said glass substrate.

In accordance with another aspect of the present invention, the bulk-machined micro pressure sensor in accordance with the present invention includes a glass substrate having an upper face defined therein a cavity having a relative small depth, and a silicon membrane attached on the upper face of the glass substrate to cover the cavity. The miniaturization of such a micro pressure sensor is applicable because the cavity is so shallow such that the side faces of the cavity are not significantly inclined with respect to the upper face of the glass substrate even though undercut in the side faces may be encountered due to an side etching effect thereby eliminating the chip area wasting problem.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
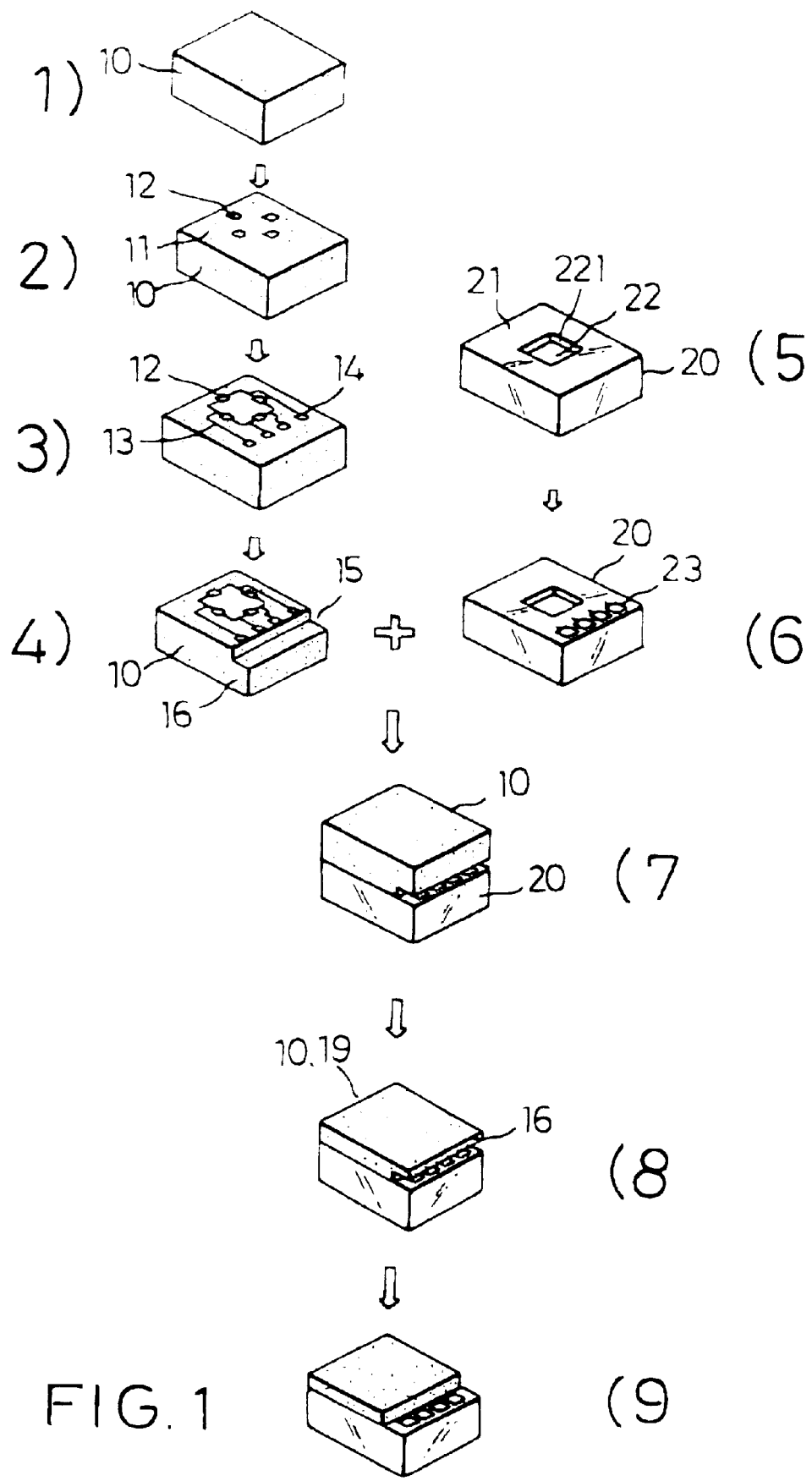
FIG. 1 shows the process for manufacturing piezo-resistive micro pressure sensors in accordance with the present invention.

With reference to FIG. 1, the manufacturing process for producing peizo-resistive micro pressure sensors in accordance with the present invention is shown, wherein a bulk silicon wafer 10 is provided in step 1.

In step 2, four piezo-rsistors 12 are formed on the upper face 11 of the bulk silicon wafer 10. Preferably, the known ion-implantation technique is used to provide the precise doping concentration of the piezo-resistors 12. The implant concentration density ranges from $10^{13}$ to $10^{14}$ cm$^{-2}$ to promise the resistance in the extent of several k-Ohms.

In step 3, circuit pattern 13 is formed on the upper face 11 of the silicon wafer 10 to properly connect the piezo-resistors 12 and provide four contact pads 14 thereby forming a Wheatstone bridge configuration. Preferably, the circuit pattern 13 is formed by metal evaporation technique and the evaporated metal for signal connection is aluminum. The thickness of the aluminum is 0.1 $\mu$m~0.3 $\mu$m.

In step 4, a cutoff 15 is defined in the upper side portion of the bulk silicon wafer 10 so that the four contact pads 14 are closed to the cutoff 15. This is implemented by partially protecting the upper face 11 of the bulk silicon wafer 10 by photo-resist and removing the upper side portion by known etching technique. That is to say, only the upper side portion is not protected by photo-resist so that the upper side portion is etched away and the cutoff 15 is defined after etching process. Accordingly, a protrusion portion 16 remains at the corresponding lower side of the bulk silicon wafer 10. The etching agent used for such a defining cutoff 15 process is HNA (Hydrofluoric Nitric Acid) solution with shallow depth of several $\mu$m.

In step 5, a glass substrate 20 is provided to have an upper face 21 defined therein a cavity 22. Preferably, the glass substrate 20 is made of Corning #7740 glass. The cavity 22 is defined by known etching technique with BOE (Buffered Oxide Etch) to have a relatively small etching depth. Because of the cavity 22 is so shallow, the side faces 221 of the cavity 22 are not significantly inclined with respect to the upper face 21 of the glass substrate 20 even though undercut in the side faces 221 may be encountered due to the side etching effect. The etching mask used for such a cavity defining process may be of good-adhesive photo-resist or even the metallic Cr-Au mask. The etching depth depends on the largest possible deformation of the silicon membrane (to be described hereinafter). Typically, the etching depth is less than 20 micrometers.

In step 6, four contact pads 23 are formed on the upper face 21 of the glass substrate 20 to provide the metal connection that the glass substrate 20 should have for signal output. Preferably, the contact pads 23 are formed by known metal evaporation technique and the evaporated metal is aluminum. The thickness of aluminum is limited below 0.3 $\mu$m for the consideration of preventing pressure-leakage along the aluminum connection.

It is noted that steps 5 and 6 are not necessary to be executed after steps 1 to 4. It is possible to execute steps 5–6 before steps 1–4 or execute steps 1–4 and steps 5–6 concurrently.

In step 7, an anodic bonding process of silicon and #7740 glass is undertaken to bond the bulk silicon wafer 10 to the glass substrate 20 in such a manner that the upper face 11 of the bulk silicon wafer 10 is attached to the upper face 21 of the glass substrate 20 and the four contact pads 14 on the bulk silicon wafer 10 have to securely contact with the four contact pads 23 on the glass substrate 20, respectively, thereby establishing proper circuit connection between the bulk silicon wafer 10 and the glass substrate 20. Furthermore, the contact pads 23 of the glass substrate 20 are under the protrusion portion 16 of the bulk silicon wafer 10. For accurate bonding, a pre-alignment between the bulk silicon wafer 10 and the glass substrate 20 is required and fairly critical. Using standard bonding alignment system is convenient but expensive. One alternative is to use the single-side mask-aligner to perform the pre-alignment before bonding. Besides, because the glass substrate 20 itself is transparent, the pre-alignment process is easy to implement.

In step 8, machining technique is used to reduce the bulk silicon wafer 10 down to a thin membrane 19. It is appreciated that the machining technique is compatible with several known etch-stop techniques, such as P$^{3O}$ etch-stop, negative-biased etch-stop, N$^-$ isotropic etch-stop and precision lapping/polishing.

In step 9, the protrusion portion 16 of the bulk silicon wafer 10 is removed by etching technique to expose the contact pads 23 on the glass substrate 20.

The manufacturing method in accordance with the present invention allows the mass production of pieso-resistive pressure sensors which can be used in tire pressure gauges and industrial pressure meters. The 1.0 mm×0.8 mm×0.5 mm of sensor size with chip density exceeds 5000 per 4-inch wafer was successfully fabricated.

Figure 2:
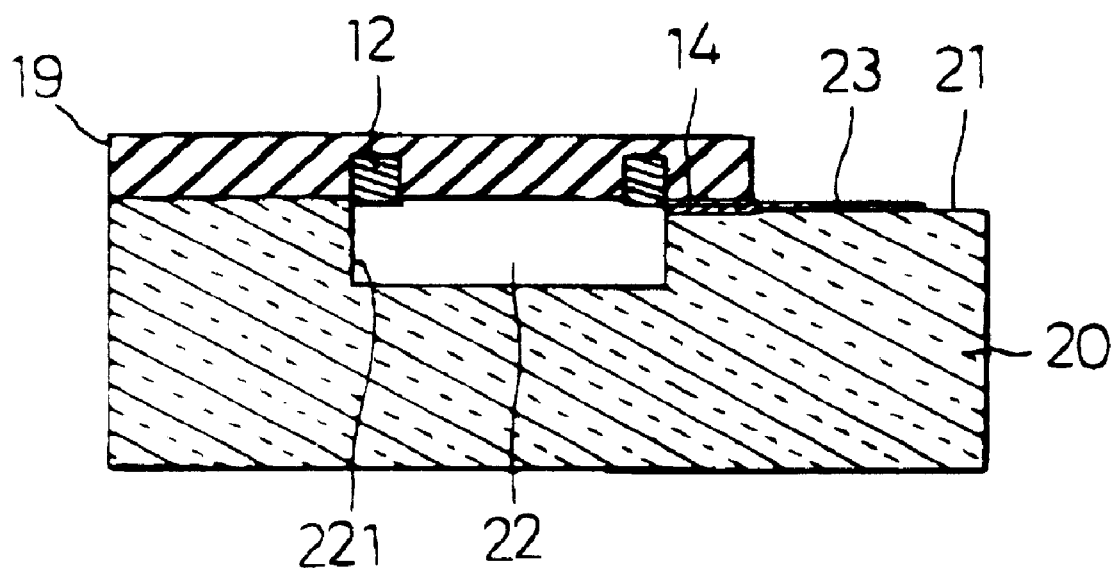
FIG. 2 is a side cross sectional view of a piezo-resistive micro pressure sensor in accordance with the present invention.

The structure of the piezo-resistive micro sensor manufactured by the above method is depicted in FIG. 2, which has the glass substrate 20 with the cavity 22 defined in the upper face 21 thereof, and the silicon membrane 19 attached on the upper face 21 of the glass substrate 20 to cover the cavity 22. The silicon membrane 19 has multiple piezo-resistors 12 located at positions around the edge of the cavity 22. The contact pads 14 of the silicon membrane 19 are combined with the contact pads 23 of the glass substrate 20 by squeezing. Because the contact pads 23 of the glass substrate 20 are not entirely covered by the silicon membrane 19 so that the pressure asserted on the silicon membrane 19 can be detected via the uncovered contact pads 23. In details, when external pressure is asserted on the silicon membrane 12 to cause a deformation on the silicon membrane 12, the physical change of the silicon membrane 12 can be transformed into electronic signals by the piezo resistors 12 and the Wheatstone bridge configuration on the silicon membrane 19. The electronic signals representing the asserted pressure are accessed via the contact pads 23 on the glass substrate 20 so that the value of the pressure can be known. Such a micro sensor structure has an advantage in that the cavity 22 is so shallow such that the side faces 221 of the cavity 22 are not significantly inclined with respect to the upper face 21 of the glass substrate 20 even though undercut in the side faces 221 may be encountered due to the side etching effect whereby no chip area is wasted and the miniaturization of the silicon bulk-machined sensors is possible. Furthermore, the membrane 19 is of monocrystalline so that stable mechanical properties and reproducible characteristics can be obtained.

Figure 3:
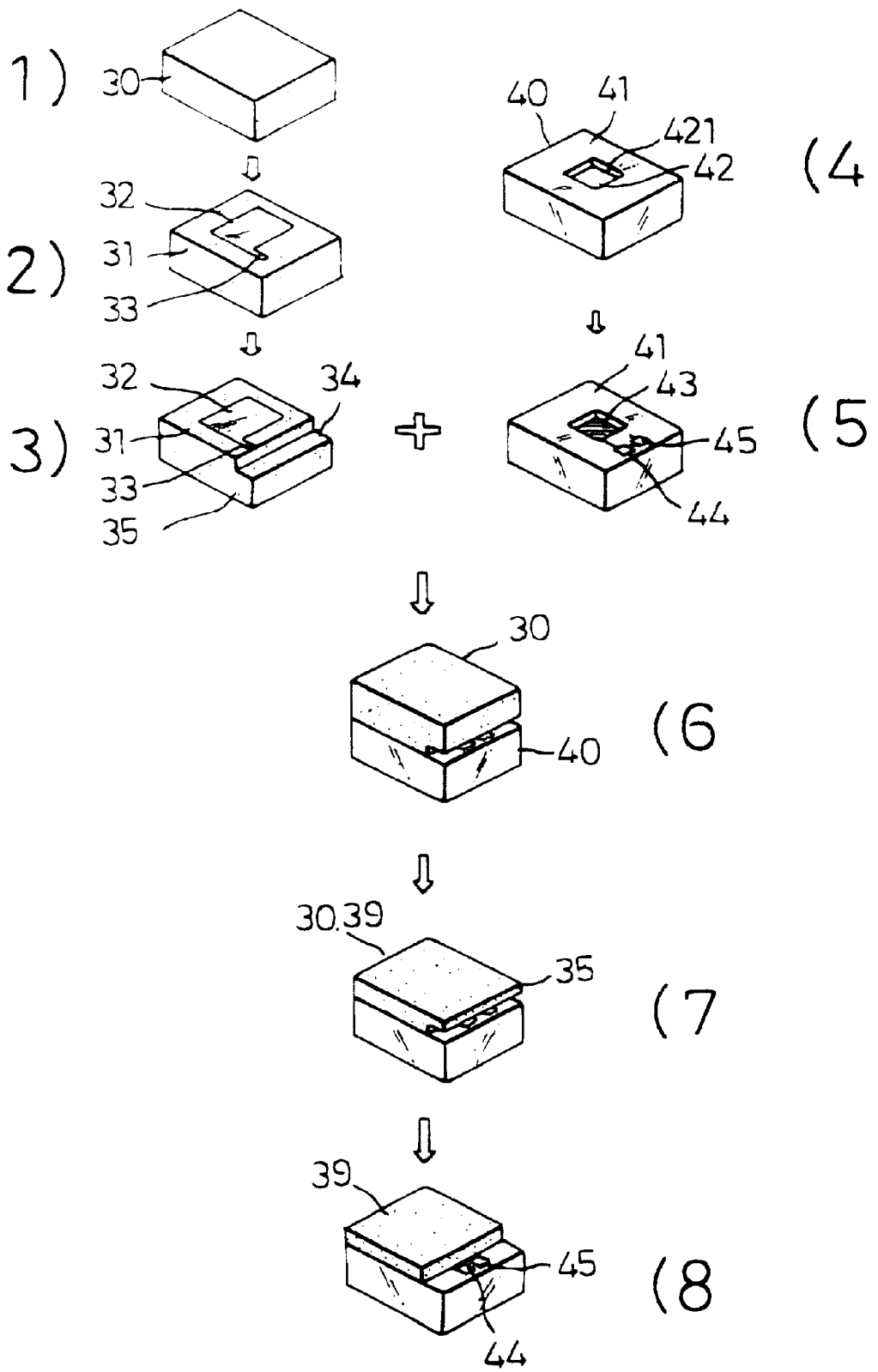
FIG. 3 shows the process for manufacturing capacitive micro pressure sensors in accordance with the present invention.

Similar manufacturing process can be applied to produce capacitive micro sensors. As shown in FIG. 3, a bulk silicon wafer 30 is provided in step 1 of the manufacturing process to produce capacitive micro sensors.

In step 2, a first metal plane 32 and a connection strip 33 extended from the first metal plane 32 are formed on the upper face 31 of the bulk silicon wafer 30 by metal evaporation technique.

In step 3, a cutoff 34 is defined in the upper side portion of the bulk silicon wafer 30 by etching technique so that the free end of the connection strip 33 is closed to the cutoff 15 and there is a protrusion portion 35 remained at the corresponding lower side of the bulk silicon wafer 30.

In step 4, a glass substrate 40 is provided to have an upper face 41 defined therein a cavity 42 having a relative small etching depth so that the side faces 42 of the cavity 42 are not significantly inclined with respect to the upper face 41 of the glass substrate 40 even though undercut in the side faces 421 may be encountered due to the side etching effect.

In step 5, a second metal plane 43 is formed on the bottom of the cavity 42, and two contact pads 44, 45 are formed on the upper face 41 of the glass substrate 40 by metal evaporation technique. One of the contact pads 44 is connected to the second metal plane 43 while the other one is not.

It is noted that steps 4 and 5 are not necessary to be executed after steps 1 to 3. It is possible to execute steps 4–5 before steps 1–3 or execute steps 1–3 steps 1–5 concurrently.

In step 6, the bulk silicon wafer 30 is bonded to the glass substrate 40 in such a manner that the upper face 31 of the bulk silicon wafer 30 is attached to the upper face 41 of the glass substrate 40 and the connection strip 33 on the bulk silicon wafer 30 is securely attached to the contact pad 45 on the glass substrate 40 that is not connected to the second plane 43.

In step 7, machining technique is used to reduce the bulk silicon wafer 30 down to a thin membrane 39.

In step 8, the protrusion portion 35 of the bulk silicon wafer 30 is removed by etching technique to expose the contact pads 44, 45 on the glass substrate 40.

The above steps can be implemented with the techniques as described in the method for manufacturing piezo-resistive micro sensors.

Figure 4:
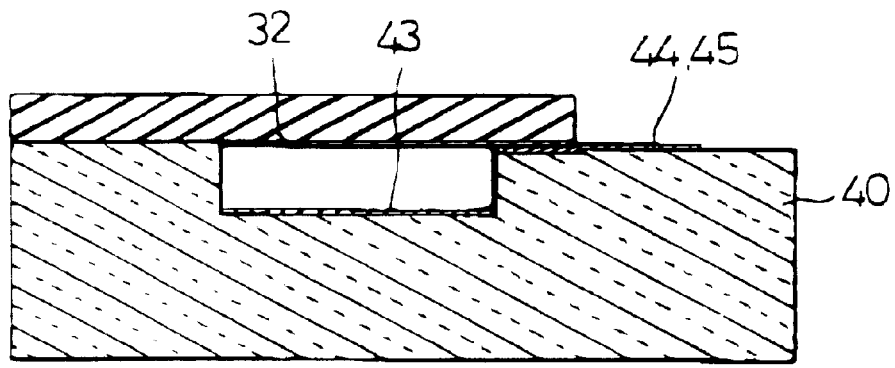
FIG. 4 is a side cross sectional view of a capacitive micro pressure sensor in accordance with the present invention.
Figure 5:
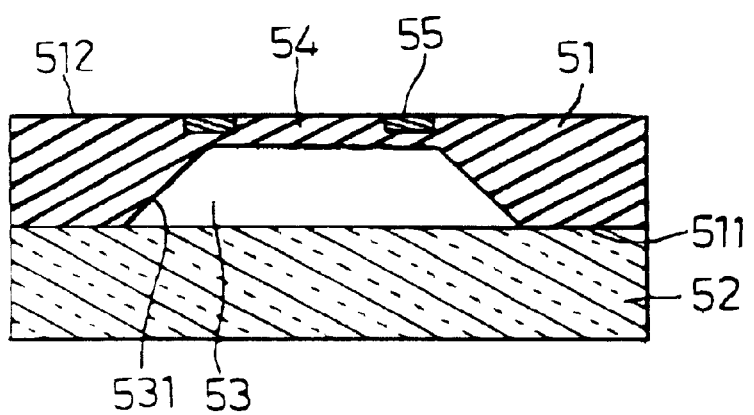
FIG. 5 is a side cross sectional view of a conventional micro pressure sensor.
Figure 6:
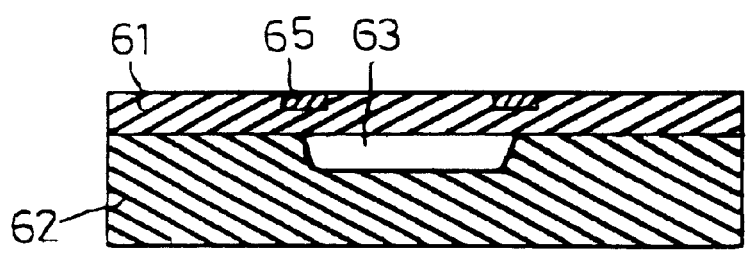
FIG. 6 is a side cross sectional view of another conventional micro pressure sensor.

The structure of the capacitive micro sensor manufactured by the above process is depicted in FIG. 4, wherein the first metal plane 32 is substantially parallel with the second metal plane 42 thereby forming a capacitor structure. The two contact pads 44, 45, which are connected to the two metal planes 43, 32, respectively, are the two connection ends of the capacitor formed by the two metal planes 32, 43. Accordingly, when pressure is asserted on the silicon membrane 39, the silicon membrane 39 is deformed and the capacitance is changed, which can be detected via the contact pads 44, 45. Again, such a capacitive micro sensor structure has the advantage in that the defined cavity 42 is so shallow such that the side faces 421 of the cavity 42 are not significantly inclined with respect to the upper face 41 of the glass substrate 40 even though undercut in the side faces 421 may be encountered due to the side etching effect whereby no chip area is wasted and the miniaturization of the silicon bulk-machined sensors is possible.

Although the present invention has been explained in relation to its preferred embodiment, it is to be understood that many other possible modifications and variations can be made without departing from the spirit and scope of the invention as hereinafter claimed.

What is claimed is:

1. A method for manufacturing piezo-resistive micro pressure sensors, comprising the steps of:
   (a) providing a bulk silicon wafer having an upper face;
   (b) forming a plurality of piezo-resistors on the upper face of said bulk silicon wafer
   (c) forming circuit pattern on the upper face of said bulk silicon wafer to connect said plurality of piezo-resistors and providing a plurality of contact pads:
   (d) defining a cutoff in an upper side portion of said bulk silicon wafer:
   (e) providing a glass substrate having an upper face defined therein a shallow cavity:
   (f) forming a plurality of contact pads on the upper face of said glass substrate;
   (g) bonding said bulk silicon wafer to said glass substrate in such a manner that the upper face of said bulk silicon wafer is attached to the upper face of said glass substrate and the plurality of contact pads on said bulk silicon wafer securely attach to the plurality of contact pads on said glass substrate;
   (h) etching to reduce said bulk silicon wafer down to a thin membrane; and
   (i) etching said bulk silicon wafer to expose the contact pads on said glass substrate.

2. The method for manufacturing piezo-resistive micro pressure sensors as claimed in claim 1, wherein, in step (b), said piezo-resistors are formed by ion-implantation technique.

3. The method for manufacturing piezo-resistive micro pressure sensors as claimed in claim 1, wherein, in step (c), said circuit pattern is formed by metal evaporation technique.

4. The method for manufacturing piezo-resistive micro pressure sensors as claimed in claim 1, wherein, in step (d), said cutoff is defined by partially protecting the upper face of the bulk silicon wafer with photo-resist and removing said upper side portion by etching technique.

5. The method for manufacturing piezo-resistive micro pressure sensors as claimed in claim 1, wherein, in step (e), said cavity is defined by etching technique.

6. The method for manufacturing piezo-resistive micro pressure sensors as claimed in claim 5, wherein glass substrate is made of Corning #7740 glass.

7. The method for manufacturing piezo-resistive micro pressure sensors as claimed in claim 1, wherein, in step (f), said plurality of contact pads are formed by metal evaporation technique.

8. The method for manufacturing piezo-resistive micro pressure sensors as claimed in claim 1, wherein, in step (g), a pre-alignment process is executed to increase the accuracy of bonding.

9. A method for manufacturing capacitive micro pressure sensors, comprising the steps of:
   (a) providing a bulk silicon wafer having an upper face;
   (b) forming a first metal plane and a connection strip extended from the metal plane on the upper face of said bulk silicon wafer;
   (c) defining a cutoff in an upper side portion of said bulk silicon wafer such that there is a protrusion portion remained at a corresponding lower side of said bulk silicon wafer:
   (d) providing a glass substrate having an upper face defined therein a shallow cavity;
   (e) forming a second metal plane in said cavity, and forming a first and a second contact pads on the upper face of said glass substrate, said first contact pad being connected to said second metal plane;
   (f) bonding said bulk silicon wafer to said glass substrate in such a manner that the upper face of said bulk silicon wafer is attached to the upper face of said glass substrate and the connection strip on said bulk silicon wafer is securely attached to the second contact pad on said glass substrate;
   (g) etching to reduce the bulk silicon wafer down to a thin membrane; and
   (h) etching away the protrusion portion of said bulk silicon wafer to expose the contact pads on said glass substrate.

10. The method for manufacturing capacitive micro pressure sensors as claimed in claim 9, wherein, in step (b), said first metal plane and said connection strip are formed by metal evaporation technique.

11. The method for manufacturing capacitive micro pressure sensors as claimed in claim 9, wherein, in step (c), said cutoff is defined by etching technique.

12. The method for manufacturing capacitive micro pressure sensors as claimed in claim 1, wherein, in step (e), said second metal plane and said contact pads are formed by metal evaporation technique.

13. A bulk-machined micro sensor comprising:
   a glass substrate having an upper face defined therein a shallow cavity; and
   a silicon membrane attached on the upper face of said glass substrate to cover said cavity.

14. The bulk-machined micro sensor as claimed in claim 13, wherein said silicon membrane has a plurality of piezo-resistors located at positions around said cavity, and a circuit pattern for connecting said plurality of piezo-resistors.

15. The bulk-machined micro sensor as claimed in claim 14, wherein said silicon membrane has a plurality of first contact pads connected to said plurality of piezo-resistors, and said glass substrate has a plurality of second contact pads which are combined with said plurality of first contact pads, respectively.

16. The bulk-machined micro sensor as claimed in claim 13, wherein said silicon membrane has a first metal plane and said cavity has a second metal plane which is substantially parallel with said first metal plane thereby forming a capacitor structure.

17. The bulk-machined micro sensor as claimed in claim 16 further comprising two contact pads connected to said first and second metal planes, respectively.

* * * * *